United States Patent
Steshenko (10) Patent No.: US 10,083,443 B1
(45) Date of Patent: Sep. 25, 2018

(54) PERSISTENT AUTHENTICATION OF A WEARABLE DEVICE

(71) Applicant: Square, Inc., San Francisco, CA (US)

(72) Inventor: Rodion Steshenko, Union City, CA (US)

(73) Assignee: SQUARE, INC., San Francisco, CA (US)

(*) Notice: Subject to any disclaimer, the term of this patent is extended or adjusted under 35 U.S.C. 154(b) by 404 days.

(21) Appl. No.: 14/738,278

(22) Filed: Jun. 12, 2015

(51) Int. Cl.
*G06Q 20/00* (2012.01)
*G06G 1/12* (2006.01)
*G06Q 40/00* (2012.01)
*H04Q 5/22* (2006.01)
*G06Q 20/40* (2012.01)
*G06Q 20/20* (2012.01)
*G06Q 20/32* (2012.01)

(52) U.S. Cl.
CPC ....... *G06Q 20/4014* (2013.01); *G06Q 20/202* (2013.01); *G06Q 20/3278* (2013.01)

(58) Field of Classification Search
None
See application file for complete search history.

(56) References Cited

U.S. PATENT DOCUMENTS

| | | | | |
|---|---|---|---|---|
| 4,129,125 A | * | 12/1978 | Lester | A61B 5/0002 374/142 |
| 5,131,399 A | * | 7/1992 | Sciarra | A61B 5/1135 128/903 |
| 2014/0266624 A1 | * | 9/2014 | Van Bosch | G06K 7/087 340/10.1 |
| 2014/0279528 A1 | * | 9/2014 | Slaby | H04L 63/0853 705/44 |
| 2014/0359744 A1 | * | 12/2014 | Hillis | H04L 63/0853 726/9 |

* cited by examiner

*Primary Examiner* — Ariel J Yu
(74) *Attorney, Agent, or Firm* — Polsinelli PC (57) ABSTRACT

A system and method for maintaining authentication of a user of a wearable device. The wearable device can include an electrical circuit, an accelerometer, a capacitive sensor, or other wearable detection module that can determine that the wearable device has been in continuous contact with, or continuous use by, the wearer. A first payment transaction can be initiated between the wearable device and a first payment terminal. A user credential is then received at either the wearable device or a mobile device coupled to the wearable device. The user credential is verified and the first payment transaction is authorized. A second payment transaction is then initiated between the wearable device and a second payment terminal. If the wearable device is determined to have been in continuous use by the user, then the second payment transaction can be completed without requiring re-authentication of the user.

20 Claims, 8 Drawing Sheets

PERSISTENT AUTHENTICATION OF A WEARABLE DEVICE

BACKGROUND

Buyers and merchants interact, either directly or indirectly over a network, to conduct point-of-sale transactions. Buyers and merchants each generally have devices used in conducting the transactions. Buyers having a wearable device, such as a watch, ring, necklace, armband, etc., can use the wearable device to participate in the point-of-sale transaction. Oftentimes, a user must authenticate the validity of the wearable device each time that the user desires to use the wearable device in a point-of-sale transaction.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

System, devices, methods, and non-transitory computer-readable media are disclosed in accordance with various embodiments of the present disclosure overcome one or more of the above-referenced and other deficiencies in conventional approaches to point of sale systems. In particular, in accordance with various embodiments, approaches provide for a payment object reader that is used in performing a payment transaction at a point-of-sale system.

Buyer devices and merchant devices frequently are used, either through direct interaction between buyers and merchants at a point-of-sale location, or indirectly, for example, over a network. A buyer can have a wearable device that can be authenticated to a proximate companion device. The wearable device can be used in addition to its proximity to the companion device, or in lieu of the companion device, to authorize the wearable device to participate in the financial transaction. The wearable device can be authenticated to the companion device proximate the wearable device by user interaction with either the companion device or the wearable device, for example by a fingerprint scan or a PIN (person identification number) entry onto a GUI of the companion device or the wearable device.

The wearable device can include an electrical circuit or other appropriate sensor to determine whether the wearable device has been in continuous contact with, or in continuous use by, the wearer of the wearable device. The electrical circuit can be a wire that forms a closed circuit, for example in a watch, such that when the watch is worn the circuit is closed, and when the watch is removed, the circuit is broken. Likewise, the electrical circuit could be in a necklace, armband, wristband, etc., to determine when the circuit is closed and being worn by the user, or when open and thus no longer being used by the user. A use sensor can also be used to determine whether the wearable device has been in continuous contact with, or in continuous use by, the buyer. For example, an accelerometer can detect when the wearable device has been motionless for a predetermined amount of time and determine that the wearable device has not been in continuous use. Likewise, the accelerometer can be used to detect that the wearable device moves at least a predetermined number of times or is only motionless for less than a predetermined amount of time, to be considered in continuous use by the buyer. A capacitive sensor can also be used to detect human skin, such that when human skin is no longer detected by the capacitive sensor, this indicates that the wearable device is no longer worn by the buyer, and a new authentication is required.

Once a user authenticates the wearable device to the companion device, or vice versa the companion device to the wearable device, the techniques herein provide for the wearable device to provide a persistent authentication as long as the wearable device is being used or worn by the user. More specifically, a first payment transaction is initiated between a wearable device and a payment terminal, which prompts the user for user authentication of the wearable device. The user can be prompted for authentication on either the wearable device or the companion device. The authentication can occur by any identification validation input by the user, such as a fingerprint scan, a PIN entry, passcode, etc.

After the user has authenticated the wearable device, a persistent authentication is established for the wearable device such that the user need not re-authenticate the wearable device so long as the wearable device is being used or worn by the user. As long as the wearable device is determined to be in continuous contact with the buyer, or in continuous use by the buyer, the persistent authentication for the wearable device remains. However, once the wearable device is determined to no longer be in contact with the buyer, or to no longer be in continuous use by the buyer, the authentication for the wearable device is removed and a new authentication is required for any subsequent transactions. This advantageously allows a user to enter multiple transactions without having to re-authenticate the wearable device, while also preventing unwanted authorization of transactions after the wearable device is no longer worn or used by the buyer.

Other advantages, variations, and functions are described and suggested below as can be provided in accordance with the various embodiments.

Figure 1:
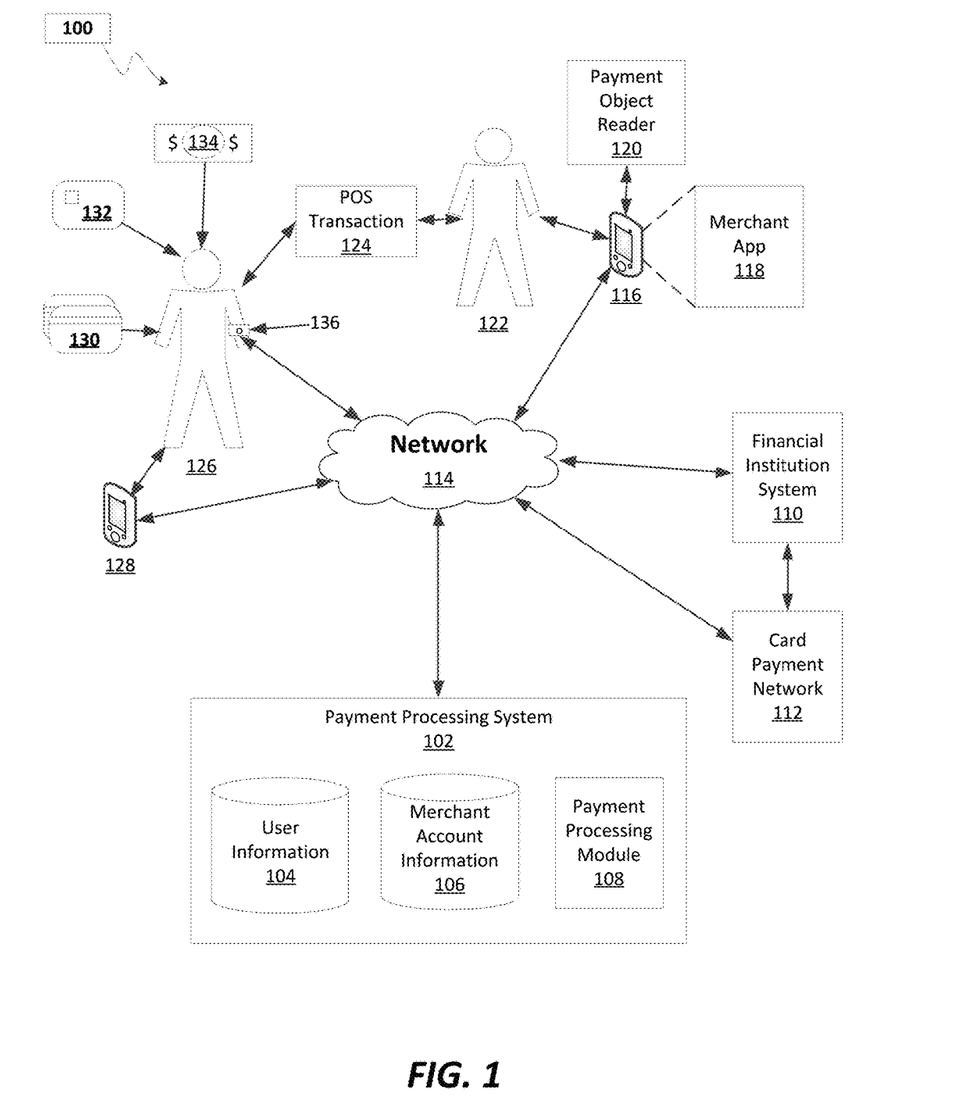
FIG. 1 illustrates an example architecture of a payment communication system for enabling transactions between merchants and buyers.

FIG. 1 illustrates an example architecture of a payment communication system 100 for enabling point-of-sale (POS) transactions between merchants 122 and buyers 126. In the example of FIG. 1, a buyer 126 can use any of a variety of payment objects, such as payment cards 130, 132 or cash 134 when participating in a POS transaction 124 with a merchant 122. A buyer 126 can typically have payment cards 130, 132 such as credit cards, debit cards, prepaid cards, and the like, that the buyer 126 can use for conducting a POS transaction 124. In some embodiments, the payment cards 130 can include one or more magnetic stripes for providing payment object and buyer information when swiped in a payment object reader 120 communicatively coupled to a merchant device 116. In some embodiments, other types of payment objects can be used, for example smart cards 132 having a built in integrated circuit including a memory chip (i.e., EMV payment objects), a radio frequency identification tag (i.e., near field communication enabled objects), and the like. In some embodiments, the user 126 can use the user device 128 to conduct NFC payment transactions through communication between the user device 128 and the payment object reader/transmitter device 120, for example.

In some embodiments, the POS transaction can occur between the buyer 126 and the merchant 122 directly at a POS location, such as the merchant place of business, or without any direct interaction between the user device 128 and the merchant device 116, for example over the network 114. Thus, the user device 128 and the merchant device 116 each communicate over the network 114 to send and receive data. The user device 128 can be a mobile device, such as a tablet, cell phone, smart phone, etc. In some embodiments, the buyer has a wearable device 136, such as a watch, wristband, headband, necklace, or other wearable device. The term "wearable" device refers to any object or device that can be worn, or otherwise affixed to, a user that can be used in participating in, or confirming authorization for, a POS transaction. In some embodiments, the wearable device 136 can also communicate directly with the buyer device 128 or to the merchant device 116 or over the network 114. The wearable device also allows a merchant to look up a customer by their wearable device, as opposed to systems requiring merchants to search for a customer by name or by face. In this manner, the user can use the wearable device to pay and the wearable device performs identity verification automatically.

The payment communication system 100 in the example of FIG. 1 illustrates a merchant device 116 associated with the merchant 122 that participates in the payment service provided by the service provider of the payment processing system 102. The merchant device 116 can be a computing device (e.g., a mobile computing device) able to communicate with the payment processing system 102, and with various other computing devices, through suitable communication protocols, interfaces, and networks, including network 114. Further, the merchant device 106 can be any appropriate device operable to send and receive requests, messages, or other types of information over the network 114. Additionally, while only a single merchant device 116 is illustrated in the example of FIG. 1, in some embodiments there can be additional merchant devices depending on the number of merchants participating in the payment service, or a plurality of components arranged as a POS system.

Each merchant device 116 can include an instance of a merchant application 118 executed on the merchant device. The merchant application 118 can provide POS functionality to enable the merchant 122 to accept payments at a POS location using the merchant device 116. In some types of businesses, the POS location can correspond to a store or other place of business of the merchant, and thus, can be a fixed location that typically does not change on a day-to-day basis. In other types of businesses, however, the POS location can change from time to time, such as in the case that the merchant 122 operates a food truck, is a street vendor, a cab driver, or has an otherwise mobile business, e.g., in the case of merchants who sell items at buyers' homes, buyers' places of business, and so forth.

The merchant device 116 is communicatively coupled to a payment object reader 120, either by direct connection, for example through an audio jack of the mobile phone connected to an audio plug of the payment object reader, or through wireless connection, such as WiFi, BlueTooth, BLE (Bluetooth low energy), NFC, or other appropriate short-range communication. The payment object reader can read data from a magnetic stripe card or an EMV chip-type card and communicate the data to the mobile phone. The payment object reader can also read data from an NFC device and communicate the data to the merchant device 116.

In some embodiments, the wearable device 136 communicates directly with the payment object reader 120, for example via WiFi, BLE, or NFC, to send payment object data from the wearable device 136 to the payment object reader 120. In some embodiments, the wearable device 136 communicates with the user device 128, which conducts the POS transaction with the merchant device 116 directly or indirectly over the network 114.

Accordingly, the merchant 122 and the buyer 126 can conduct a POS transaction 124 by which the buyer 126 acquires an item or service from the merchant 122 at a POS location. The merchant application 118 on the merchant device 116 can send transaction information to the payment processing system 102, e.g., as the transaction is being conducted at the POS location. In some embodiments, such as if a particular merchant device 116 is not connected to the network 114 and is therefore processing transactions offline, the transaction information can be sent in a batch at a subsequent point in time or using other suitable techniques. In some embodiments, the transaction information can be sent via SMS, MMS, or a voice call.

In some embodiments, the payment system is configured to send and receive data to and from the user device and the merchant device. For example, the payment system can be configured to send data describing merchants to the user device using, for example, the information stored in the merchant account information database 106. The data describing merchants can include, for example, a merchant name, geographic location, contact information, and an electronic catalogue, e.g., a menu that describes items that are available for purchase from the merchant.

In some embodiments, the payment system can also be configured to communicate with a computer system of a card payment network 112, e.g., Visa or MasterCard, etc., over the network, or over a different network, for example, to conduct electronic financial transactions. The computer system of the card payment network can communicate with a computer system of a card issuer 110, e.g., a bank. There can be computer systems of other entities, e.g., the card acquirer, between the payment system and the computer system of the card issuer.

The payment system can then communicate with the computer system of a card payment network 112 to complete an electronic financial transaction for the total amount to be billed to the customer's financial account. Once the electronic financial transaction is complete, the payment system can communicate data describing the card-less payment transaction to the user device, e.g., an electronic receipt, which can, for example, notify the customer of the total amount billed to the user for the card-less payment transaction with the particular merchant.

The network 114 can be a conventional type, wired or wireless, and can have numerous different configurations including a star configuration, token ring configuration, or other configurations. Furthermore, the network 114 can include an intranet, a local area network (LAN), a wide area network (WAN) (e.g., the Internet), and/or other interconnected data paths across which multiple devices can communicate. In some embodiments, the network 114 can be a peer-to-peer network. The network 114 can also be coupled with or include portions of a telecommunications network for sending data using a variety of different communication protocols. In some embodiments, the network 114 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 114 coupled to the merchant device, payment processing system, card payment network, and bank, more that one network 114 can connect these entities. The payment system, the merchant device, and the user device can communicate over the network using wired or wireless connections, or combinations thereof.

Figure 2:
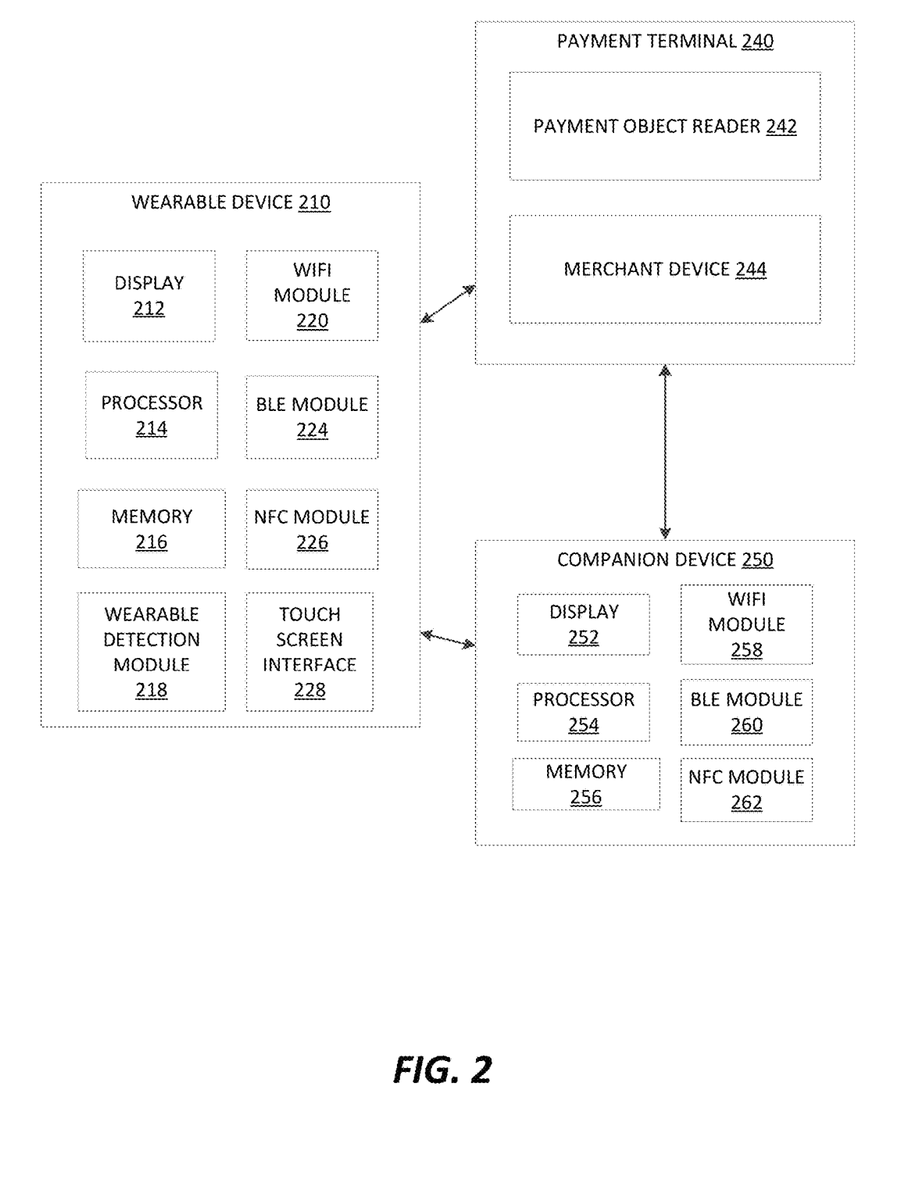
FIG. 2 illustrates an example schematic block diagram of the components of a wearable device, a companion device and a payment terminal.

FIG. 2 illustrates an example schematic block diagram of the components of the wearable device, a companion device and a payment terminal. As shown, the wearable device 210 can communicate directly with either the payment terminal 240 to conduct a payment transaction, or with the companion device 250. Although depicted as direct connections, it is also possible for the wearable device 210, the payment terminal 240 and the companion device 250 to communicate wirelessly, for example using WiFi or over another appropriate network.

The wearable device 210 includes a display 212 and a processor 214 that drives the components of the wearable device 210. The wearable device 210 has memory 216 for storing programs and instructions for the processor 214 to carry out functions of the various modules of the wearable device 210. The wearable device 210 also includes a wearable detection module 218 that indicates whether the wearable device 210 has been in continuous contact with, or in continuous use by, the wearer of the wearable device. The wearable detection module 218 can comprise an accelerometer that indicates motion of the wearable device. Accordingly, a lack of motion for a predetermined amount of time indicates that the wearable device is no longer being used by the wearer. The wearable detection module 218 can comprise an electrical circuit that determines whether the wearable device is being worn by a user. For example, if the wearable device is a watch, the electrical circuit can comprise a wire lead that is run through the band of the watch such that when the end of the watch contact each other, the electrical circuit is closed, indicating that the watch is being worn. Likewise, when the electrical circuit is broken, this indicates that the wearable device is no longer being worn by the user.

The wearable device 210 also includes communication modules for communicating with the payment terminal 240 and the companion device 250. The wearable device 210 can include a WiFi module 220, a BLE (Bluetooth low energy) module 224, and an NFC module 226. In some embodiments one or more of the communication modules can be omitted depending upon the functionality of the wearable device. For example, the wearable device may only include an NFC module 226 and a microcontroller (in lieu of a processor 214 and memory 216) in the wearable device for communicating with a payment terminal 240. The wearable device can include a touch screen interface 228 for receiving touch inputs on the display 212 of the wearable device 210 and sending the inputs to the processor for processing.

The companion device 250 is in communication with the wearable device 210, for example over WiFi, Bluetooth Low Energy or through NFC communication. The companion device 250 includes a display 252, a processor 254 and memory 256. An operating system and other applications of the companion device 250 can be stored in memory 256. The companion device 250 can include a WiFi module 258, a BLE module 260, and an NFC module 262 for sending and receiving data to the wearable device and/or to the payment terminal. The authentication that is received at the companion device remains with the wearable device as a persistent authentication so long as the wearable device is in continuous use by, or in continuous contact with, a person.

In some embodiments, the proximity of the wearable device to the companion device 250 can be used in conjunction with the authentication of the wearable device to ensure that the devices are in the person's possession. In some embodiments, the proximity of the companion device 250 to the wearable device 210 can be an additional or alternative mechanism for authentication. When the wearable device is determined to be in close proximity to the companion device, and the wearable device 210 is determined to be in continuous use by the person wearing the wearable device, this can provide verification as to the authenticity of the wearable device.

The wearable device 210 and the companion device 250 can be any combination of an authenticating device and an authenticatable wearable where the wearable device maintains the authorization. In some embodiments, the wearable device 210 does not need a display or a user interface in order to participate in payment transactions.

The payment terminal 240 includes a payment object reader 242 and a merchant device 244. The payment object reader can comprise a magnetic stripe read head for reading magnetic stripe-type cards, an integrated circuit (IC) chip interface for reading data from IC payment objects, and an NFC interface for reading data from NFC-enabled payment objects. The components of the merchant device 244 are shown in greater detail hereinbelow with reference to FIG. 10.

Figure 3:
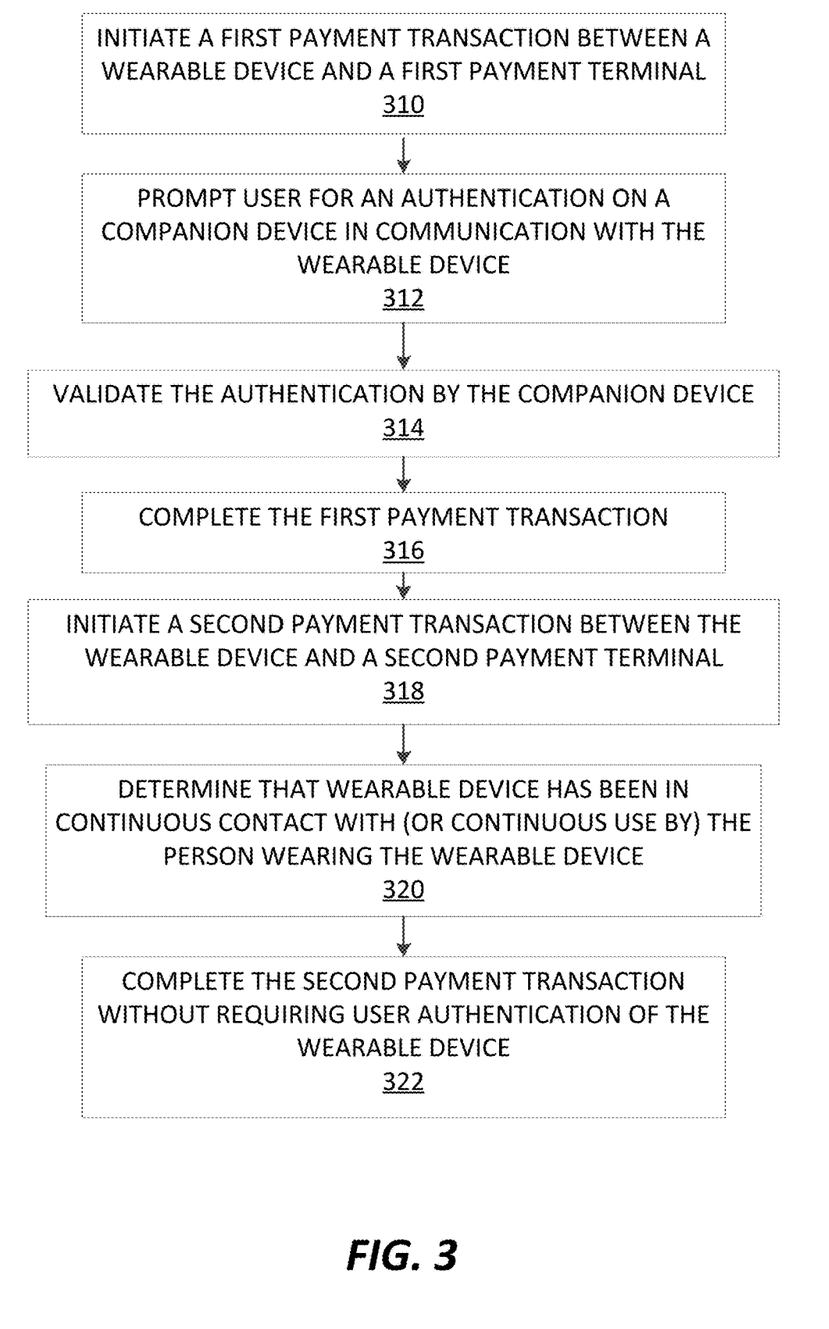
FIG. 3 illustrates an example flow chart of a procedure for maintaining authentication of a wearable device used in payment transactions where authentication is received at a companion device.

FIG. 3 illustrates an example flow chart of a procedure for maintaining authentication of a wearable device used in payment transactions where authentication is received at a companion device. At 310, a first payment transaction is initiated between a wearable device and a first payment terminal. This can occur by a merchant device sending an initial communication request to the wearable device or, vice versa, by a wearable device sending an initial communication request to the first payment terminal. The initiation of the first payment transaction can occur via NFC communication, WiFi, BLE, or other appropriate short-range communication. At 312, user is then prompted for an authentication on a companion device that is in communication with the wearable device, such as a cell phone of the user. The user can provide an authentication, such as a fingerprint scan on the companion device, a personal identification number (PIN) entry on the companion device, or other form of authentication. Other forms of authentication include, but are not limited to, a passcode, entering an e-mail address and a password, voice recognition or another form of biometric input.

At 314, the companion device validates the authentication. This can occur, for example, by the companion device securely sending the authentication to a payment server that stores authentication data for wearable devices. For example, the payment processing system shown in FIG. 11 has user data stored therein, which can include the authentication data for the user. At 316, the first payment transaction is completed upon receiving and validating the authentication received at the companion device.

At 318, a second payment transaction is initiated between the wearable device and a second payment terminal. The second payment terminal can be the same as the first payment terminal used in the first payment transaction, or it can be a different payment terminal. The second payment transaction can be initiated by the wearable device or by the second payment terminal.

At 320, the wearable device determines that it has been in continuous contact with, or in continuous use by, the wearer of the wearable device. This can be accomplished by an electrical circuit within the wearable device, such as an electrical lead within the band of a wearable watch device that is completed when the wearable device is worn by a person, such that the electrical circuit being closed indicates that the wearable device is worn by a person. Thus, the wearable device is able to determine that the wearable device has been in continuous contact with the user when the wearable detection module of the wearable device indicates that the electrical circuit has remained closed since the first payment transaction. In this manner, the wearable device can assume that the same person has been wearing the wearable device since the first financial transaction, and thus, there is no need for an additional authentication. In some embodiments, an accelerometer can be used to determine that the wearable device has been in continuous use by the user. The accelerometer can have a threshold amount of time such that, when the accelerometer is determined to be motionless for at least that threshold amount of time, the device is determined to be no longer be used by the user. Likewise, as long as the accelerometer remains in motion for another predetermined amount of time, the wearable device can determine that the wearable device is in continuous use by the wearer. In some embodiments, a capacitive sensor on the wearable device can detect the presence of human skin, and thus the capacitive sensor can be used to determine if the contact with the human skin is broken. If the capacitive sensor detects that it is no longer in contact with the person, this indicates that the wearable device is not in continuous use by the user. However, so long as the capacitive sensor senses skin, it determines that the wearable device is in continuous use by the wearer.

Once it is determined that the wearable device has been in continuous contact with, or in continuous use by, the person wearing the wearable device, then at 322, the second payment transaction is completed without requiring user authentication of the wearable device. In this manner, a user can authenticate themselves on the companion device for the first payment transaction, and then if the wearable device determines that the wearable device has been in continuous contact with, or continuous use by, a user, then a second authentication is not needed, and the wearable device can participate in the payment transaction without requiring any re-authentication.

In some embodiments, once a wearable device has been authenticated, and the wearable detection module of the wearable device indicates continuous use of the wearable device, the wearable device can be used to interact with other devices. For example, the wearable device can be used to open a door, to turn on a computer, etc. In some embodiments, a message can appear on the wearable device, or on the companion device, asking the user if they wish to perform the task associated with the other device.

In some embodiments, the wearable device, once authenticated by the wearer, can be used to perform additional tasks other than a financial transaction. Accordingly, it is determined that the wearable device is in physical contact with a user, the identity of the user is authenticated (i.e. via finger print scan, PIN or passcode entry), and a request for authentication associated with a transaction is received. Thereafter, the request for authentication is answered automatically when the wearable device is still in physical contact with the user and has been in continuous physical contact with the user since the authenticating the identity of the user. The wearable device can, itself, determine whether the wearable device has been in physical contact with a user, or the mobile device in communication with the wearable device can determine whether the device has been in physical contact with the user. The request for authentication associated with a transaction can be sent from a separate device and received at the wearable device. For example, a separate device, such as another computer, can send a request to the user of the wearable device to participate in a non-financial transaction, such as turning the other computer on. Other transactions include, but are not limited to, opening a smart door lock, working with an IoT (internet of things) type of appliance, or logging into a webpage. The wearable device is in communication with a mobile device and the wearable device receives information necessary for answering the authentication request from the mobile device.

In some embodiments, the mobile device or the wearable device determine that the wearable device is in physical contact with a user by a capacitive sensor, an electronic circuit, using an accelerometer that is in continuous motion with brief pauses in motion that do not exceed a predetermined amount of time, or other sensing techniques disclosed herein. The identity of the user in physical contact with the wearable device can be authenticated by user input on the mobile device or user input on the wearable device. When a request is received for authentication associated with a separate transaction, the request can automatically be answered when the wearable device is still in physical contact with the user.

Figure 4:
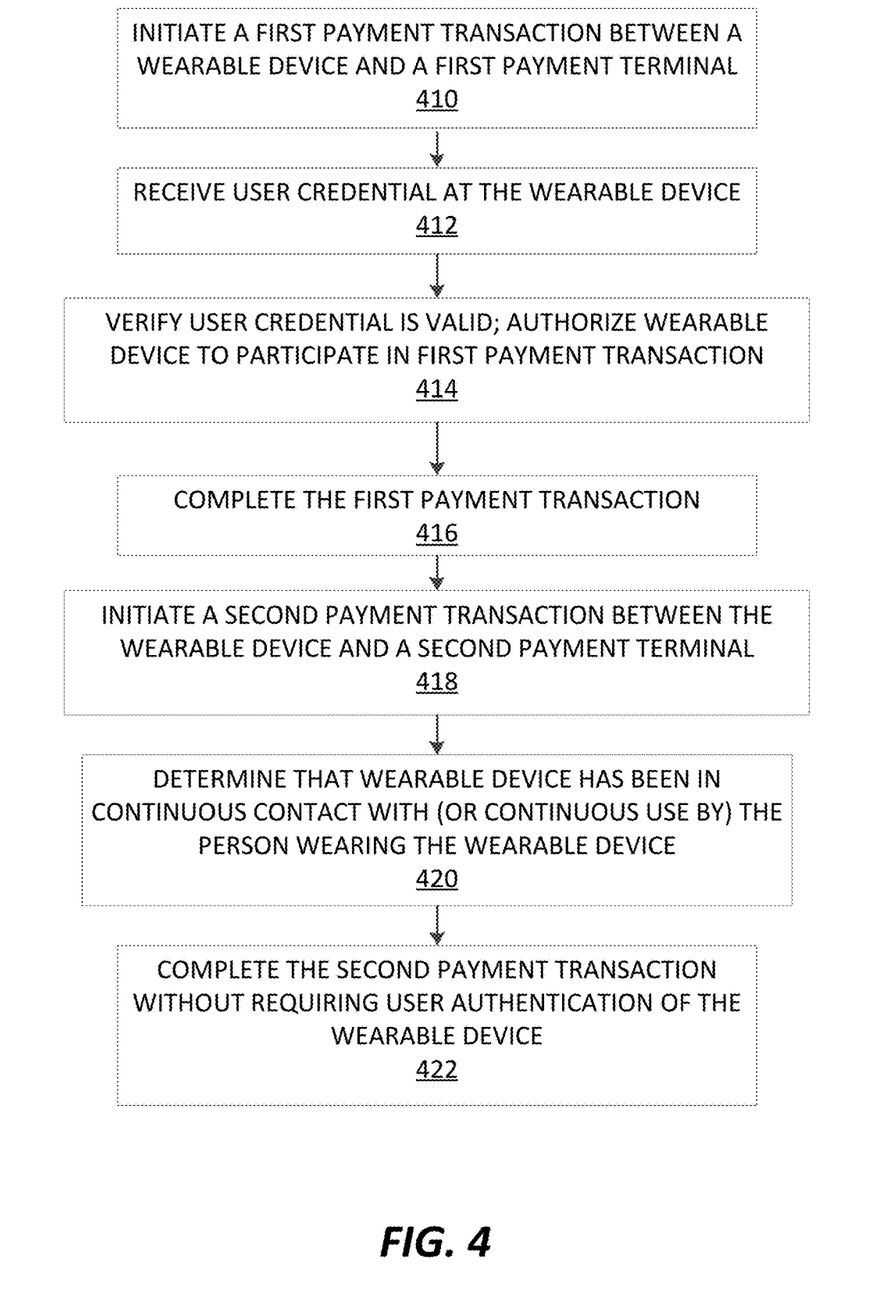
FIG. 4 illustrates an example flow chart of a procedure for maintaining authentication of a wearable device used in payment transactions where authentication is received directly at the wearable device.

FIG. 4 illustrates an example flow chart of a procedure for maintaining authentication of a wearable device used in payment transactions where authentication is received directly at the wearable device. At 410, a first payment transaction is initiated between a wearable device and a first payment terminal. At 412, a user credential is received at the wearable device directly. This does not require the companion device to be used to authorize the wearable device. The user credential can be an input of a PIN entry, a fingerprint scan, or other appropriate user authentication. At 414, the user credential is verified by the wearable device as being valid, for example by sending the information to a payment processing server, and the wearable device is authorized to participate in a first payment transaction. At 416, the first payment transaction is completed.

At 418, a second payment transaction is initiated between the wearable device and a second payment terminal. At 420, the wearable device determines that it has been in continuous contact with, or continuous use by, the wearer of the wearable device. This can be accomplished by the wearable detection module of the wearable device. For example, an accelerometer can determine that there have been no pauses longer than a predetermined amount of time, indicating continuous use by the user, or an electrical circuit can remain unbroken, indicating the wearable device is still being worn by the user. At 422, the second payment transaction is completed without requiring the user to re-authenticate the wearable device. In this manner, transactions can be completed more efficiently without requiring authentication of the same user to the wearable device so long as the wearable device determines that the wearable device has been in continuous contact with or in continuous use by, the wearer.

Figure 5:
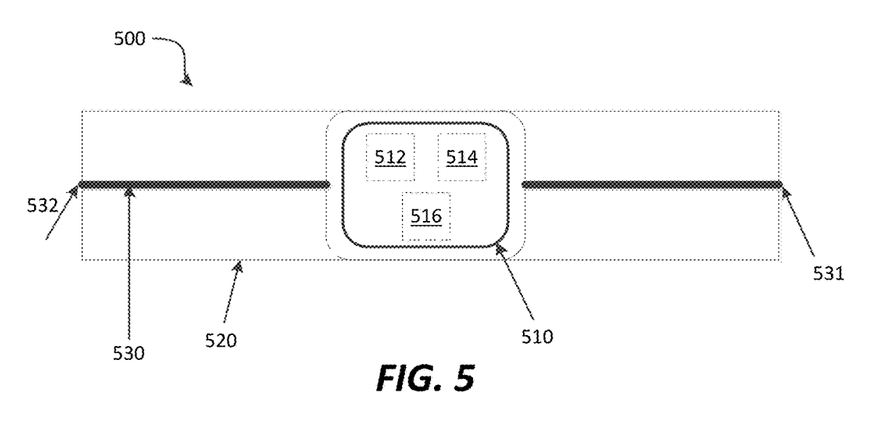
FIG. 5 illustrates a perspective view of a wearable watch device in an open position as viewed from a top view.
Figure 7:
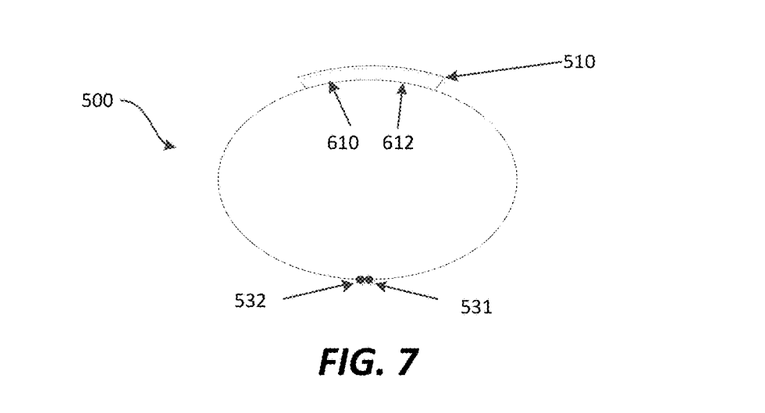
FIG. 7 illustrates a perspective view of a wearable watch device in a closed position as viewed from a side.

FIG. 5 illustrates a perspective view of a wearable watch device in an open position as viewed from a top view. The wearable watch device 500 includes a display 510 and a band 520. In this embodiment, an electrical lead 530 having opposing ends 531, 532 is disposed within the band 520 of the wearable watch device 500. When the opposing ends 531, 532 come into contact with one another, as shown in FIG. 7, the wearable device is determined to be in contact with, or in use by, the wearer of the wearable device. Shown in dotted-line as being disposed under the display 510, the wearable device 500 includes a use sensor 512, for example an accelerometer, a processor 514 and memory 516. The memory includes instructions for carrying out the functions of the processor in performing payment transactions and sending and receiving information. In some embodiments, the processor 514 and memory 516 can be replaced with a microcontroller.

Figure 6:
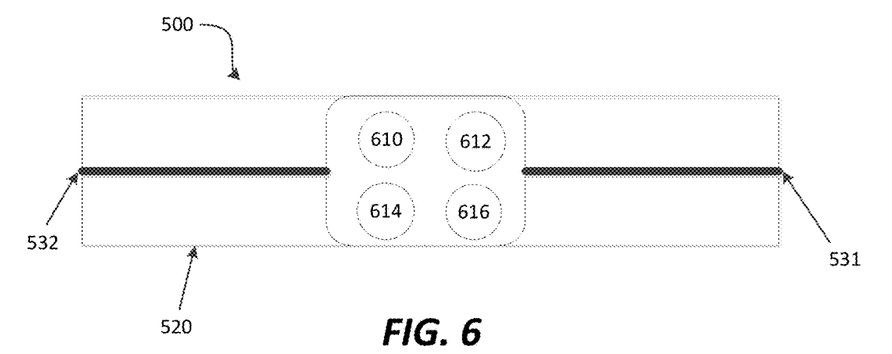
FIG. 6 illustrates a perspective view of a wearable watch device in an open position as viewed from a bottom view.

FIG. 6 illustrates a perspective view of a wearable watch device in an open position as viewed from a bottom view. As shown, a bottom side of the wearable watch device 500 includes a plurality of capacitive sensors 610, 612, 614, 616. The capacitive sensors can be used to detect contact with skin to indicate that the wearable watch device 500 is being worn by a user. Skin has a certain amount of capacitance, and thus the capacitive sensors can be used to detect this amount of capacitance. When the capacitive sensors 610, 612, 614, 616 determine that one or more of the sensors are no longer in contact with the user, this indicates to the wearable device that a new authentication is required to perform subsequent payment transactions. Although four capacitive sensors are shown, it should be apparent that a single capacitive sensor, or a plurality of sensors up to any number, can be used to detect contact with a wearer of the wearable watch device 500. In some embodiments, a thermistor can be used instead of, or in addition to, the capacitive sensors, to detect temperature from a person to determine that the wearable device is in contact with the person.

FIG. 7 illustrates a perspective view of a wearable watch device in a closed position as viewed from a side. As shown, the opposing ends 531, 532 of the electrical lead are touching, thus closing the electrical circuit, and indicating that the wearable device is being worn by the user. Thus, the user can authenticate to the wearable device for a first payment transaction, and then as long as the electrical circuit remains closed, authentication is not required for subsequent payment transactions. It is also contemplated that the opposing ends 531, 532 be replaced with inductive leads that can detect when the leads are in close proximity, but not necessarily touching. In this manner, when the ends of the leads are sufficiently close to each other, they can be considered to be a closed circuit, and the wearable watch device is determined to be in continuous use.

Figure 8:
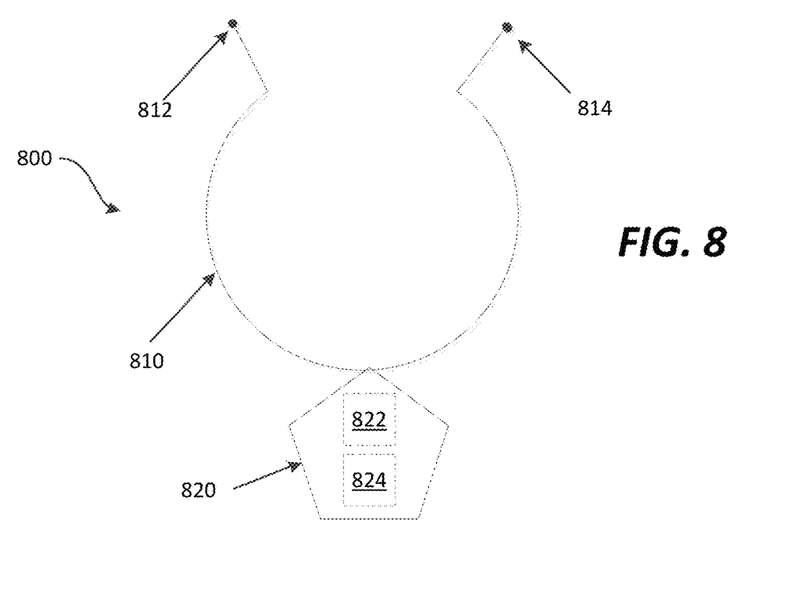
FIG. 8 illustrates a perspective view of a wearable necklace device in an open position.

FIG. 8 illustrates a perspective view of a wearable necklace device in an open position. As shown, the wearable necklace device 800 includes a loop 810 to be placed around the neck of a wearer of the wearable necklace device 800. On opposing ends of the loop are leads 812, 814 that detect when the wearable necklace device 800 is in contact with, or in continuous use by, a wearer. The wearable necklace device 800 includes an interface 820 that can be used in performing payment transactions. The interface 820 can include a communication module 822, such as an NFC module, and a microcontroller 824. The microcontroller 824 can be configured to conduct financial payment transactions with payment terminals using the wearable necklace device 800. In some embodiments, the microcontroller can be replaced with a processor and memory.

Figure 9:
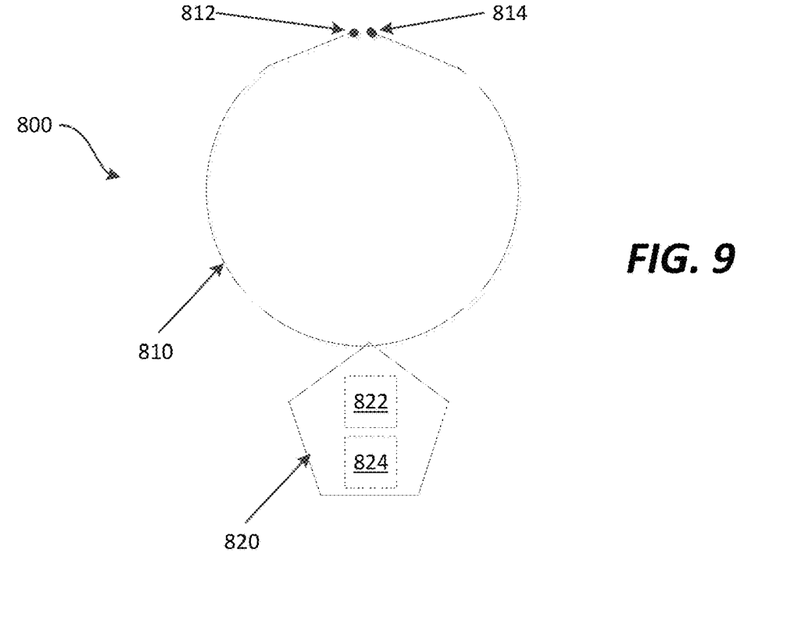
FIG. 9 illustrates a perspective view of a wearable necklace device on a closed position.

FIG. 9 illustrates a perspective view of a wearable necklace device 800 on a closed position. The opposing leads 812, 814 of the loop 810 are now in close proximity to each other, indicating that the wearable necklace device 800 is in contact with the wearer. The opposing leads 812, 814 can be inductive leads such that they do not need to physically contact each other to detect the presence of one another, but instead must be in sufficiently close proximity to detect each other. The leads 812, 814 can also be conductive leads that physically touch to close the electrical circuit. The leads 812, 814 can be magnets that have the electrical lead embedded therein such that when the magnets touch, the leads contact each other to close the electrical circuit.

Figure 10:
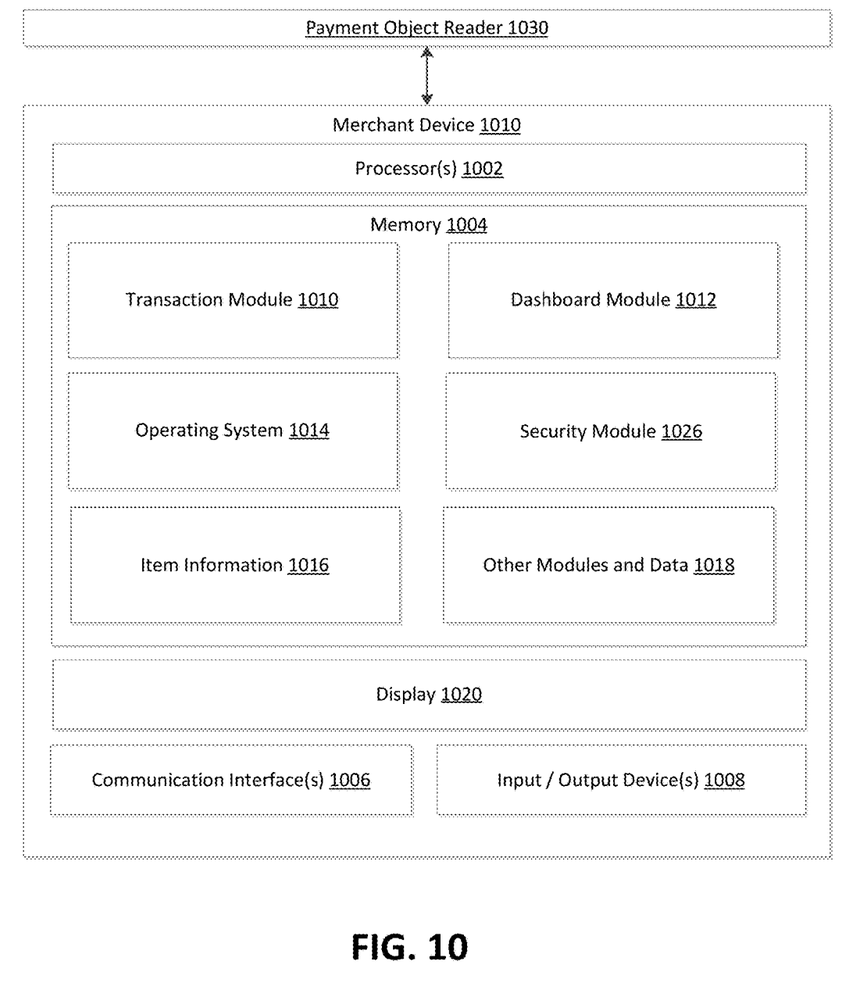
FIG. 10 illustrates an example block diagram of components of a merchant device.

FIG. 10 is a block diagram illustrating select components of an example merchant POS system according to some embodiments. A merchant device 1010 can be the merchant device 116 shown in FIG. 1, for example. The merchant device 1010 can be any suitable type of computing device, e.g., portable, semi-portable, semi-stationary, or stationary device.

In the example illustrated in FIG. 10, the merchant device 1010 includes at least one processor 1002, a memory 1004, one or more communication interfaces 1006, and one or more input/output (I/O) devices 1008. Each processor 1002 can itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some embodiments, the processor 1002 can be one or more hardware processors and/or logic circuits of any suitable type specifically programmed or configured to execute the algorithms and processes described herein by performing various input/output, logical, and/or mathematical operations. The processor 1002 can be configured to fetch and execute computer-readable processor-executable instructions stored in the memory 1004.

Other components included in the merchant device 1010 can include various types of sensors (not shown), which can include a GPS device, an accelerometer, gyroscope, compass, proximity sensor, and the like. Additionally, the merchant device 1010 can include various other components that are not shown, examples of which include removable storage, a power source, such as a battery and power control unit, and so forth.

Depending on the configuration of the merchant device 1010, the memory 1004 can be an example of non-transitory computer storage media (e.g., computer-readable media) and can include volatile and nonvolatile memory and/or removable and non-removable media implemented in any type of technology for storage of information such as computer-readable processor-executable instructions, data structures, program modules or other data. The computer-readable media can include, but is not limited to, RAM, ROM, EEPROM, flash memory, solid-state storage, magnetic disk storage, optical storage, and/or other computer-readable media technology. Further, in some cases, the merchant device 1010 can access external storage, such as RAID storage systems, storage arrays, network attached storage, storage area networks, cloud storage, or any other medium that can be used to store information and that can be accessed by the processor 1002 directly or through another computing device or network. Accordingly, the memory 1004 can be computer storage media able to store instructions, modules or components that can be executed by the processor 1002.

The memory 1004 can be used to store and maintain any number of functional components or modules that are executable by the processor 1002. In some embodiments, these functional components comprise instructions or programs that are executable by the processor 1002 and that, when executed, implement operational logic for performing the actions and services attributed above to the merchant device 1010. Functional components of the merchant device 1010 stored in the memory 1004 can include a transaction module 1010, a dashboard module 1012, and a security module 1026, although it can also contain modules or portions of modules assigned herein to the payment processing system 102. The transaction module 1010, dashboard module 1012 and security module 1026 can all be a part of a merchant application, for example merchant application 118, running on merchant device 116. The transaction module 1010, for example, presents an interface, such as a payment interface to enable the merchant to conduct transactions, receive payments, and so forth, as well as for communicating with the payment processing system 102 for processing payments and sending transaction information. The dashboard module 1012 enables the merchant to manage the merchant's account, the merchant profile, merchant preferences, view saved or new pricing information, communicate with the payment processing system 102 regarding cash advances, offers of incentives, invitations, and the like. The security module 1026 can, as described herein, enable the merchant application to encrypt and decrypt transaction information communicated between the merchant device 1010 and other system components. Additional functional components can include an operating system 1014 for controlling and managing various functions of the merchant device 1010 and for enabling basic user interactions with the merchant device 1010.

In addition, the memory 1004 can also store data, data structures and the like, that are used by the functional components. For example, data stored by the memory 1004 can include item information 1016 that includes information about the items offered by the merchant, which can include a list of items currently available from the merchant, images of the items, descriptions of the items, prices of the items, and so forth. For instance, when the merchant application 118 is setting up the merchant application 118 to accept payments for particular items offered by the merchant 122, the merchant can enter the item information 1016 for the particular items. Depending on the type of the merchant device 1010, the memory 1004 can also optionally include other functional components and data, such as other modules and data 1016, which can include programs, drivers, etc., and the data used or generated by the functional components. Further, the merchant device 1010 can include many other logical, programmatic and physical components, of which those described are merely examples that are related to the discussion herein.

The communication interface(s) 1006 can include one or more interfaces and hardware components for enabling communication with various other devices, such as over the network(s) 114 or directly. For example, communication interface(s) 1006 can enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 1006 can include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 1006 also provides other conventional connections to the network 114 for distribution of files and/or media objects using standard network protocols such as TCP/IP, HTTP, HTTPS and SMTP as will be understood.

The merchant device 1010 can further include a display 1020, which can employ any suitable display technology. For example, the display 1020 can be a liquid crystal display, a plasma display, a light emitting diode display, an OLED (organic light-emitting diode) display, an electronic paper display, or any other suitable type of display able to present digital content thereon. In some embodiments, the display 1020 can have a touch sensor associated with the display 1020 to provide a touchscreen display configured to receive touch inputs for enabling interaction with a graphical user interface presented on the display 1020. Accordingly, embodiments described herein are not limited to any particular display technology. Alternatively, in some embodiments, the merchant device 1010 might not include the display X20, and information can be presented by other means, such as aurally.

The merchant device 1010 can further include one or more I/O devices 1008. The I/O devices 1008 can include speakers, a microphone, a camera, and various user controls (e.g., buttons, a joystick, a keyboard, a keypad, etc.), a haptic output device, and so forth.

In addition, the merchant device 1010 can include or can be connectable to a payment object reader 1030. In some embodiments, the payment object reader 1030 can plug in to a port in the merchant device, such as a microphone/headphone port, a data port, or other suitable port, or can communicate via wireless connection to the merchant device. The payment object reader 1030 can include a card interface 1006 for reading a magnetic stripe or an integrated circuit of a payment card 130, 132, and further can include encryption technology for encrypting the information read from the payment card 130, 132. Alternatively, numerous other types of payment object readers 1030 can be employed with the merchant devices 1010 herein, depending on the type and configuration of the merchant device 1010.

Figure 11:
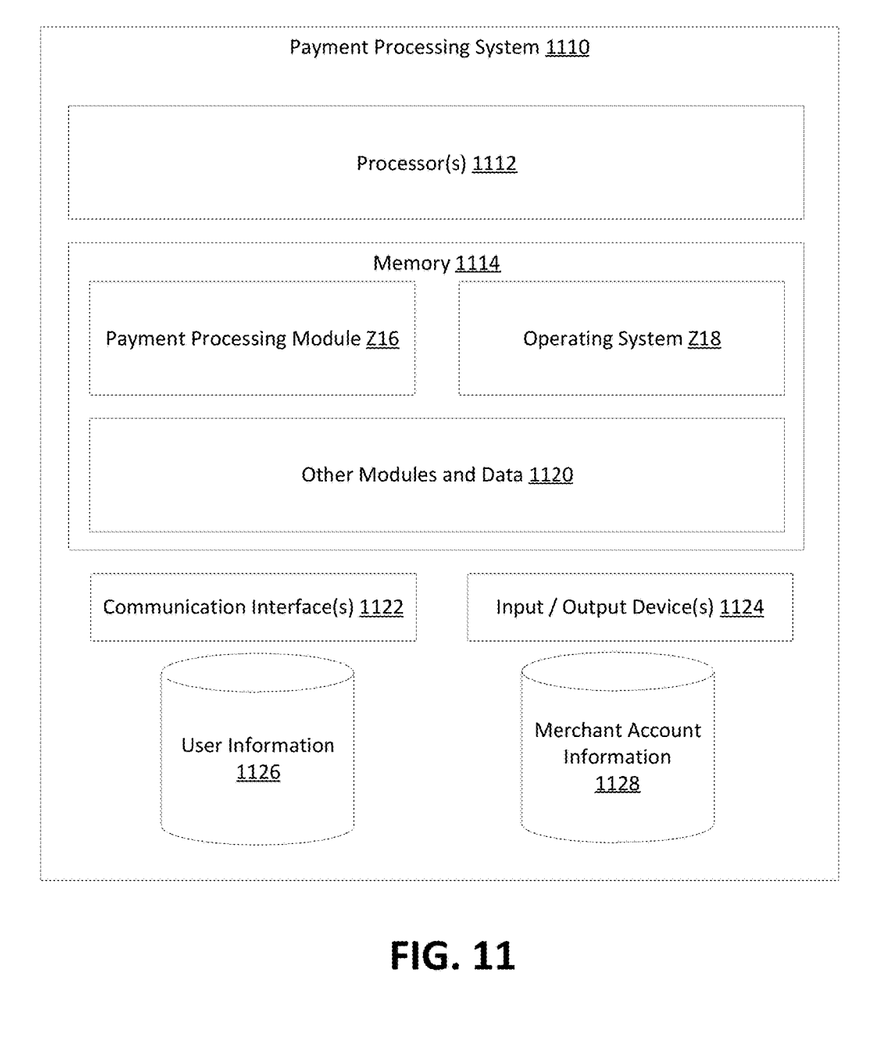
FIG. 11 illustrates an example block diagram of components of a payment processing system.

FIG. 11 is a block diagram illustrating select components of an example payment processing system 1110 according to some embodiments. The payment processing system 1110 can comprise the payment processing system 102 in an example embodiment. The payment processing system 1110 can be any suitable type of computing device capable of sending communications and performing the functions according to the techniques described herein and can be operated by a service provider that provides the payment processing service. For instance, in the case of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the examples herein illustrate the components and data of the payment processing system 1110 as being present in a single location, these components and data can alternatively be distributed across different computing devices and different locations. Consequently, the functions can be implemented by one or more computing devices, with the various functionality described above distributed in various ways across the different computing devices, to collectively implement the payment processing system 1110. Multiple payment processing systems 1110 can be located together or separately, and organized, for example, as virtual servers, server banks and/or server farms. The described functionality can be provided by the servers of a single entity or enterprise, or can be provided by the servers and/or services of multiple different buyers or enterprises.

In the example of FIG. 11, the payment processing system 1110 includes one or more processors 1112, one or more memory devices 1114, one or more communication interfaces 1122, and one or more input/output devices 1124. These components can be similar to those described above with reference to FIG. 1 and elsewhere herein.

The memory 1114 can be used to store and maintain any number of functional components or modules that are executable by the processor 1112. In some embodiments, these functional components comprise instructions or programs that are executable by the processor 1112 and that, when executed; implement operational logic for performing the actions and services attributed above to the payment processing system 1110. Functional components of the payment processing system 1110 stored in the memory 1114 can include the payment processing module 1116, the operating system 1118, and other modules and data 1120. These components can be similar to those described with reference to FIG. 1 and elsewhere herein. In addition, the memory 1114 can store data used for performing the operations described herein. Thus, the memory 1114 can store merchant information 1126, including the merchant profiles. Further, the payment processing system 1110 can include many other logical, programmatic and physical components, of which those described above are merely examples that are related to the discussion herein.

For clarity of explanation, in some instances the present technology can be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of maintaining authentication of a user of a wearable device that is used in a payment transaction, the method comprising:

initiating a first payment transaction between the wearable device and a first payment terminal;

receiving a user credential at the wearable device;

verifying that the user credential is valid for the wearable device to authorize the wearable device to participate in the first payment transaction;

authorizing the first payment transaction;

initiating a second payment transaction between the wearable device and one of the first payment terminal and a second payment terminal;

determining by the wearable device that the wearable device has been in continuous proximity with the user of the wearable device during a time between initiating the first payment transaction and initiating the second payment transaction by identifying that a first inductive lead of the wearable device has been in continuous proximity with a second inductive lead of the wearable device during the time between initiating the first payment transaction and initiating the second payment transaction; and completing the second payment transaction without requiring the user credential to be received at the wearable device a second time based on having determined that the wearable device has been in continuous proximity with the user of the wearable device during the time between initiating the first payment transaction and initiating the second payment transaction.

2. The method of claim 1, further comprising:
receiving a second user credential before receiving the user credential; and
determining that the second user credential is not valid for payment transaction authorization and requesting entry of the user credential.

3. The method of claim 1, wherein determining by the wearable device that the wearable device has been in continuous proximity with the user of the wearable device is based on an accelerometer of the wearable device and comprises one of:
determining that the accelerometer of the wearable device has been in motion for at least a first predetermined amount of time, or
determining that the accelerometer of the wearable device has been motionless for less than a second predetermined amount of time.

4. The method of claim 1, wherein determining by the wearable device that the wearable device has been in continuous proximity with the user of the wearable device comprises determining that an electrical circuit in the wearable device is closed and has been closed at least since the first payment transaction was initiated.

5. The method of claim 4, wherein the electrical circuit includes the first inductive lead and the second inductive lead, wherein the first inductive lead and the second inductive lead allow the electrical circuit to remain closed when the first inductive lead and the second inductive lead are in proximity but are not touching.

6. The method of claim 1, further comprising:
initiating a third payment transaction;
determining by the wearable device that the wearable device has not been in continuous proximity with the user of the wearable device since initiating the first payment transaction; and
requiring re-entry of the user credential at the wearable device to complete the third payment transaction in response to determining that the wearable device has not been in continuous proximity with the user of the wearable device since initiating the first payment transaction.

7. The method of claim 1, wherein determining by the wearable device that the wearable device has been in continuous proximity with the user of the wearable device comprises determining that a capacitive sensor coupled to the wearable device is in continuous contact with the user at least from the initiating of the first payment transaction to the initiating of the second payment transaction.

8. The method of claim 1, wherein determining by the wearable device that the wearable device has been in continuous proximity with the user of the wearable device comprises detecting a temperature associated with the user at the wearable device via a thermistor of the wearable device.

9. The method of claim 1, wherein determining by the wearable device that the wearable device has been in continuous proximity with the user of the wearable device comprises determining that a physical loop that is part of the wearable device and that is worn around a body part of the user remains closed.

10. The method of claim 1, wherein determining by the wearable device that the wearable device has been in continuous proximity with the user of the wearable device comprises detecting that the wearable device has been in continuous proximity with a companion device associated with the user by detecting that the wearable device and the companion device were in continuous range of each other via one or more short-range wireless communication protocols.

11. The method of claim 1, wherein determining by the wearable device that the wearable device has been in continuous proximity with the user of the wearable device comprises receiving an output from a proximity sensor of the wearable device indicating that the wearable device has been in continuous proximity with the user of the wearable device.

12. A wearable device, comprising:
a device processor;
a first inductive lead;
a second inductive lead; and
memory including instructions that, when executed by the device processor, cause the device processor to:
initiate a first payment transaction between the wearable device and a first payment terminal;
receive a user credential for a user at the wearable device;
verify that the user credential is valid for the wearable device to authorize the wearable device to participate in the first payment transaction;
authorize the first payment transaction;
initiate a second payment transaction between the wearable device and one of the first payment terminal and a second payment terminal;
determine that the wearable device has been in continuous proximity with the user of the wearable device during a time between initiating the first payment transaction and initiating the second payment transaction by identifying that the first inductive lead of the wearable device has been in continuous proximity with the second inductive lead of the wearable device during the time between initiating the first payment transaction and initiating the second payment transaction; and
complete the second payment transaction without requiring the user credential to be received at the wearable device a second time based on having determined that the wearable device has been in continuous proximity with the user of the wearable device during the time between initiating the first payment transaction and initiating the second payment transaction.

13. The wearable device of claim 12, further comprising an accelerometer, and wherein execution of the instructions by the device processor causes the device processor to determine that the wearable device has been in continuous proximity with the user during the time between initiating the first payment transaction and initiating the second payment transaction by determining, based on the accelerometer, that the wearable device has been in motion for at least a first predetermined amount of time or that the wearable device has been motionless for less than a second predetermined amount of time.

14. The wearable device of claim 12, further comprising an electrical circuit that is closed when the wearable device is in proximity with the user, wherein determining that the wearable device has been in continuous proximity with the user includes determining that the electrical circuit has remained closed.

15. The wearable device of claim 14, wherein the electrical circuit includes the first inductive lead and the second inductive lead, wherein the first inductive lead and the second inductive lead allow the electrical circuit to remain closed when the first inductive lead and the second inductive lead are in proximity but are not touching.

16. The wearable device of claim 12, further comprising a capacitive sensor, wherein determining that the wearable device has been in continuous proximity with the user includes detecting contact between the capacitive sensor and skin of the user.

17. The wearable device of claim 12, wherein the instructions, when executed by the device processor, cause the device processor to:
   initiate a third payment transaction at one of the first payment terminal, the second payment terminal, or a third payment terminal.

18. The wearable device of claim 17, wherein the instructions, when executed by the device processor, cause the device processor to:
   determine that the wearable device has not been in continuous proximity with the user of the wearable device during a time between initiating the first payment transaction and initiating the third payment transaction by identifying that the first inductive lead has not been in continuous proximity with the second inductive lead during the time between initiating the first payment transaction and initiating the third payment transaction;
   prompt the user for re-entry of the user credential at the wearable device in response to determining that the wearable device has not been in continuous proximity with the user of the wearable device during the time between initiating the first payment transaction and initiating the third payment transaction;
   receiving the user credential at the wearable device; and
   complete the third payment transaction in response to receipt of the user credential.

19. The wearable device of claim 12, further comprising a thermistor, and wherein determining that the wearable device has been in continuous proximity with the user of the wearable device comprises detecting a temperature associated with the user via the thermistor.

20. The wearable device of claim 12, further comprising a proximity sensor, wherein determining that the wearable device has been in continuous proximity with the user of the wearable device is based on the proximity sensor.

* * * * *